Figure 1:
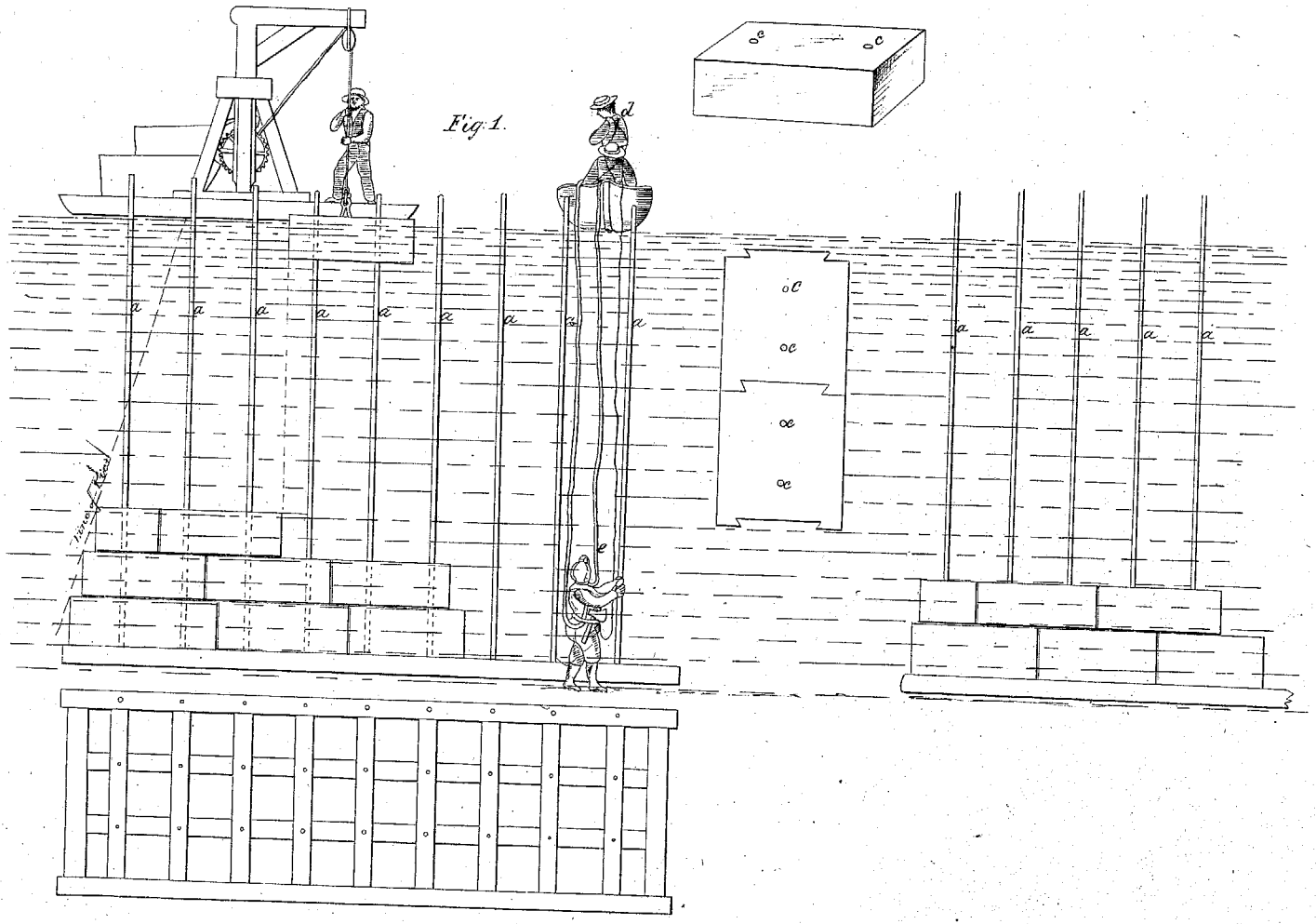

9309X

No Printed Specification Available

J. C. Pray.

Sea Wall.

Patented Jan. 11, 1836.

N. PETERS, PHOTO-LITHOGRAPHER, WASHINGTON, D. C.

9309X

Jan 11, 1836

John G Bray of Brooklyn New York

Letters Patent

The Schedule referred to in these Letters Patent and making part of
the same containing a description in the words of the said John G
Bray himself of his improvement in the construction of Wharves Piers
Piers of Bridges and Breakwaters or artificial Harbours To all to whom these presents shall come. Be it known that I John
G Bray of the City of Brooklyn in the County of Kings and State of
New York have invented a new and useful improvement in the Build-
ing and constructing of Wharves Piers, Piers of Bridges and Break-
waters or artificial Harbours. and the following is a full and exact
description of the said improvement. In the construction of all
of the above works (which may be of stone or cast iron) it is inten-
ded to put the Blocks of stone or cast iron in their places by means
of conductors secured in the foundation which is to be laid and put in
place by means of the diving Bell. When the foundation is laid which
is done with the greatest ease. Blocks piers or pillars of any dimen-
sions may be reared thereon in the following manner
If a Wharf is intended take square Blocks of Granite or any other
hard stone or even of cast iron say eight or ten feet long and one
or two feet square. prepare two of them with a conductor to each
end of iron or copper say from one to two inches in diameter (or
larger if found necessary) and to be so placed that when the stone or [illegible]
or foundation is secured on the bottom the said conductor will reach
above the surface of the water. When that is done prepare two
more stones or blocks of cast iron of the same size having holes through
them so that they can be received on the ends of the aforesaid conductors and
passing down the same let them be placed transversely across the
two first. The ends of each Block having been previously so cut
or prepared that they may come together with a dove tail —
In the same way continue to place each Block, passing down some 9309X Jan 11, 1836

[illegible] by means of rods through said Blocks transversely across each
previous layer until the pillar is raised above the surface of the water.
Let each succeeding tier of blocks be so much shorter than the last
that when the pier is raised to the surface of the water there may be a
difference of four feet between the base and the top. but this difference
must be all on the outer side. For a wharf twenty five or thirty
feet wide three of these piers pillars will be necessary. They may be placed
ten feet from the abutment in a line and for every twenty feet in length
of Wharf one line of these piers or pillars will be required. and if ten
feet base they will be placed ten feet apart. When the said piers or
pillars are raised a little above the surface of the water arches are to
be turned from one line of piers or pillars to the other. and over
the top of these arches after squaring the work may be laid heavy
flagging. None of the stone need to be cut except for the dovetailing
above described and also for the facing in finishing the upper part of
the wharf. Uprights are placed eight or ten feet apart up and down
the sides of the Wharf, to keep vessels from rubbing against the stone
work. and instead of dovetailing they must be doweled. Piers of Bridges
are intended to be built in the manner as one of the piers above de
scribed with this addition they must be larger at the base and bec
ome nearly solid — Breakwaters or artificial Harbours are
on the same principle with this difference. that instead of piers
of any kind it must be a wall of from twenty feet to fifty feet
and one hundred feet in thickness. same must be done in a com
pact manner and be commenced on shore and carried off into the
Bay or water in the direction which may be preferred and be continued
in the manner above mentioned In testimony that the above is a true specification of my said
improvement as above described I have hereto set my hand
the fourteenth day of September in the year of our Lord one thou
sand eight hundred and thirty five Witnesses
[illegible] Saml. C. Dewey
T Furman Jno G Ray. 8506